(12) United States Patent
Hein

(10) Patent No.: US 8,499,784 B2
(45) Date of Patent: Aug. 6, 2013

(54) LOCK VALVE IN PARTICULAR FOR A STRIP PROCESSING UNIT

(75) Inventor: Stefan Hein, Blankenbach (DE)

(73) Assignee: Applied Materials GmbH & Co. KG, Alzenau (DE)

( * ) Notice: Subject to any disclaimer, the term of this patent is extended or adjusted under 35 U.S.C. 154(b) by 1972 days.

(21) Appl. No.: 10/574,867

(22) PCT Filed: May 25, 2004

(86) PCT No.: PCT/EP2004/005617
§ 371 (c)(1),
(2), (4) Date: Apr. 6, 2006

(87) PCT Pub. No.: WO2005/116501
PCT Pub. Date: Dec. 8, 2005

(65) Prior Publication Data
US 2007/0107781 A1  May 17, 2007

(51) Int. Cl.
*F16K 51/02* (2006.01)
(52) U.S. Cl.
USPC .......................... 137/383; 414/217
(58) Field of Classification Search
USPC .................. 137/383; 118/50, 50.1, 718, 719, 118/733; 414/217
See application file for complete search history.

(56) References Cited

U.S. PATENT DOCUMENTS

| | | | | | |
|---|---|---|---|---|---|
| 2,952,569 | A | * | 9/1960 | Baer et al. | 427/295 |
| 3,090,134 | A | * | 5/1963 | Morrison | 34/242 |
| 3,351,348 | A | * | 11/1967 | Dupuis | 277/345 |
| 3,807,058 | A | * | 4/1974 | Seminski | 34/242 |
| 4,808,444 | A | * | 2/1989 | Yamazaki et al. | 427/420 |
| 6,386,511 | B1 | | 5/2002 | Watanabe et al. | |
| 6,576,296 | B1 | * | 6/2003 | Yapel et al. | 427/294 |

FOREIGN PATENT DOCUMENTS

| | | |
|---|---|---|
| EP | 0291952 | 11/1988 |
| JP | 01172570 | 10/1989 |
| WO | 9950472 | 10/1999 |

* cited by examiner

*Primary Examiner* — John Bastianelli
(74) *Attorney, Agent, or Firm* — Price Heneveld LLP

(57) ABSTRACT

An air-lock valve (1), especially for a band processing plant, provided for closing a gap-like opening (3), traversed by a flexible band substrate (4), between two different plant sections, featuring at least one moveable sealing body (7), cooperating with a sealing surface (5), when it closes said opening (3), and eventually said band substrate (4) is being firmly mounted between said body (7) and sealing surface (5) during the closing operation of said air-lock valve (1), is characterized, according to the invention, in that the sealing surface (5) surrounds opening (3) in frame-like fashion, and in order to close opening (3), said body (7) may be pressed in such a fashion upon sealing surface (5) and/or upon band substrate (4), traversing said opening (3), that it obstructs said opening (3) at least due to indirect juxtaposition at the edges of said sealing surface (5).

28 Claims, 1 Drawing Sheet

LOCK VALVE IN PARTICULAR FOR A STRIP PROCESSING UNIT

FIELD OF THE INVENTION

The present invention refers to an air-lock valve, especially for a band treating or coating plant.

BACKGROUND OF THE INVENTION

Processing plants of this type are mainly designed for coating flexible band substrates, such as, for example, plastics foils, magnetic tapes, films, etc. in vacuum (for example, by sputtering, i.e., target atomization, eventually reinforced by magnetic fields, evaporation, PVD or CVD processes), as well as for additional processing methods, such as pre-processing/cleaning/drying/surface activation/polymerization, etc. It is required, in such cases, to introduce into the plant the band substrates, supplied in the form of bales or foils, which are being placed upon a bearing axle, so that during the coating process, the band substrate may be unrolled from this bale.

Beyond (downstream from the coating chamber(s)), another axle is provided with a take-up reel, upon which the coated band substrate is again being winded.

Basically, such a band coating plant may be split up into modules (unrolling, coating and take-up modules).

On known plants, both axes or cylinders, bilaterally mounted for unrolling and winding up said band substrate, are assembled on a common frame-like base, which offers the advantage that they are in a reciprocal constant and firm positional relationship. When both axes or cylinders are disposed on both sides of the coating module, during the exchange of spools it can be avoided, by means of separate measures, to ventilate also the coating chamber(s) operating in vacuum.

It should be aimed not to ventilate the coating chamber, operating in vacuum, at each exchange of the substrate bale, i.e., when removing from a band substrate a newly rolled up bale, which has just been coated.

It is, therefore, already known to mount air-lock valves between individual modules. The volume which is to be ventilated is thus clearly reduced, since only the intake and removal stations, respectively, are being ventilated and the effective coating chamber may permanently remain in an evacuated condition. Evidently, in case of need, the entire plant may be ventilated.

A known air-lock valve consists of a (pneumatically, hydraulically) inflatable tube or membrane seal, disposed in a passage area of the band substrate. In the inflated condition, the seal is being pressed against the sealing surface, provided beyond the band substrate (preferably elastically flexible), thus firmly gripping the band substrate between itself and said sealing surface.

Although during normal operations the band substrate does not establish contact neither with the tube nor membrane seal, or with said sealing surface, the available passage slot must remain quite narrow, in view of the narrowly limited stroke of the tube or membrane seal. During eventual oscillations of the band substrate during the coating process, contacts may thus occur between said substrate and the border areas of the passage, which, during the evacuation phase from the coating chamber, could result in damages of the coating, which has just been applied. Additionally, due to such undesired contacts, even a rupture of the band substrate under quite high tensile stress may be caused, which again would imply in a forcible paralyzation of the plant.

Problems are also caused by the intense stress of the hollow seal in vacuum, since it is being exposed to extreme pressure differences. Therefore, its wall section (membrane or tube) must be built quite firmly, which again negatively affects its flexibility. Consequently, seal deficiencies may result in the marginal seal area, especially at points where it overlaps the borders of the band substrate (a type of wedge is being formed there, whose surface should evidently be minimized, according to the possibilities).

Lastly, with this known form of seal, the unilateral atmospheric pressure (from the respectively ventilated chamber) acts upon the seal, forcing it into the vacuum chamber.

Document DE 199 12 707 A1 describes a processing plant for a plane, for example, band-like substrates. Two revolving bands pass through its (evacuable) housing, contacting each other in the areas of the passages to introduce and remove the substrate, or including the plane substrate, which they transport between themselves. A sufficient sealing effect is being obtained here due to the spatial contact of both bands with the substrate, but resulting in an extremely reduced width of the passage gap and in a constant superficial contact of said substrate with the conveyor belts.

Document DE 199 60 751 A1 describes another air-lock of this type, which essentially comprises two cylinders with flexible, tube-like casings, which contact each other and between which a band substrate may pass. To improve the sealing effect and in order to minimize lateral gaps between said cylinders and the borders of the passing substrate, the cylinder casings may be pressurized at least temporarily. During this procedure, they inflate and increase, on one side, the contact pressure upon the substrate, and, on the other side, they largely close said lateral gaps. In the area of the vacuum chamber, the cylinder casing surfaces are being supported with supporting rolls towards the inside of the vacuum chamber, to avoid excessive expansion, which implies a considerable additional effort.

Document DE 44 18 383 C2 comprises a vacuum air-lock, which also operates with two reciprocally contacted cylinders, between which a band substrate may pass through. In this case, the cylinders are merely equipped with a cover of elastic and flexible material.

Also document WO 99/50 472 describes a vacuum band coating plant, in which the band substrate must pass through cylinder air-locks between loading and discharge stations and the effective reaction chamber, said cylinder air locks acting as pressure stages. In one version, it may pass between two cylinders rolling upon each other, and, in another version, it may pass between a cylinder and a fixed sealing block. These cylinder air-locks may be opened, in order to introduce, for example, a new band substrate. For this purpose, either one of the cylinders may be folded out, its rotary axis being mounted foldable around an axis of rotation, or the sealing block will be removed from the cylinder. In a variant with only one cylinder, the band is being transported between the cylinder and sealing block through quite a narrow gap, however open at its end, in order not to be submitted to excessive mechanical stress. A complete sealing cannot be obtained in this variant.

SUMMARY OF THE INVENTION

The object of the invention consists in providing an additional air-lock valve for static sealing purposes, with which it is possible to avoid, or at least to reduce, the problems mentioned above.

To improve the air-lock valve, a frame-like sealing face formed, which surrounds the opening through which the band substrate passes. A body corresponds with the sealing surface, which is disposed on one side of the band substrate, being moveably mounted with a mechanically operated stroke. Said body is adjusted in such a fashion on the sealing surface, that it can wholly overlap the opening surface it encompasses and, simultaneously, may close it completely. This latter procedure should be considered independently of whether a band substrate is passing or not through the opening.

In the first case, the segment of the band substrate is simply mounted between the body and the sealing surface, when it will be flexibly deformed and will also not be damaged, when the sealing surface and the body are adequately designed. During this process, the body evidently establishes only an indirect contact with the sealing surface, since the band substrate is positioned in a fashion similar to an additional sealing means.

This disposition and function of the air-lock valve offers the advantage that at each change of the band, i.e., normally after the complete passage of a band spool through the coating plant, one segment of the band may remain inside the coating chamber, i.e., inside the module, consisting eventually of different subsequently placed coating chambers. After introduction of a new spool into the unrolling chamber, the new band substrate may be firmly glued with said segment, whilst on the rolling up side, the remaining section is being applied upon an empty spool. After evacuating both loading or exchange chambers, the initial section of the new band substrate may be introduced into the coating plant by means of the remaining segment.

In the other case, when no band substrate is present in the opening, the body closes the opening by means of a direct circumferential contact with the sealing surface.

According to a favorable embodiment, at least the body, preferably also the sealing surface, has an arcuate shape or surface. If the sealing surface is essentially plain and only the body is arcuate, the body will be sized in such a fashion that it contacts the reciprocally opposed sealing edges of the sealing surface, or fixes the band substrate between itself and said edges.

Evidently, an existing radius of curvature of the sealing surface must be larger, or at least equal, to the radius of the arcuate surface provided on the body and facing towards the sealing surface, in order that the aforementioned edge sealing effect may be attained.

With this configuration, one avoids especially too strong bending angles of the band substrate in the closed position of the air-lock valve. With a plane sealing surface, this will at least be placed in an inclined position upon the band substrate vis-à-vis the vertical line, so that the band section fixed by the sealing body will be bent only in an obtuse angle during the closing phase of the air-lock valve. With arcuate sealing face contour, its global curvature will be correspondingly applied, as will be described later in more detail, based on the exemplary embodiment.

It is understood that the edges of the sealing surface, on one side, should consist of flexible material (for example, rubber, soft plastics, etc.), in order to improve the sealing effect by means of superficial adhering, and, on the other side, they should also be quite well rounded, in order to practically exclude damages (buckling, folds, fissures) at the band substrate. Specifically, also the body is preferably provided with an elastically flexible surface material, such as the sealing surface, or is wholly manufactured from such material.

In one embodiment, the body is configured as a cylindrical roll. This offers the advantage that always the same body points do not necessarily have to cooperate with the sealing surface. The body may also be designed with a profile, which corresponds to only one segment of a circular ring or a roll circumference.

The body is somewhat larger than the opening, so that in the closed position it overlaps all edges of the opening, which is thus totally sealed.

A preferred embodiment of the air-lock valve comprises a housing, in which said opening, the sealing surface and the body with its mounting, and eventually the drive, may be assembled in a modular form.

Reversible electrical or fluidic drives may be considered, for transposition or reversal of the body, eventually with interposition of an adequate power transmission or linkage. Since under normal operating conditions of the plant, the air-lock valve does not have to be constantly reversed bidirectionally, a manual drive could also be provided and the body could eventually be mounted on the sealing surface by means of an accumulator (for example, a mechanical or gas-pressure spring) or a toggle joint or similar device. A manual drive will be provided, for example in the event of a failure of foreign power drives.

In a general sense, such an assembly of said sealing body of the air-lock valve by means of an accumulator, independently of the drive type (foreign or manual power) would offer the advantage that a constant contact power is being continuously provided. It will be understood that such an accumulator must be designed in a sufficiently sturdy fashion, in order to overcome also an eventually existing traction of the band substrate firmly, fixing it on the sealing surface.

Advantages of the solution according to the invention are especially as follows:

The gap of the opening can be larger as occurs in the prior art, so that with opened valve, eventual vibrations of the band substrate surpassing a trajectory, do not promptly result in contacts with the edges of the opening. Damages at coatings and band ruptures are thus largely excluded.

Different from the prior art, a fluidic pressure operated valve body is no longer required, so that with the configuration according to the invention, its disadvantages, as explained above, may be avoided.

It is possible to assemble the sealing surface along the corresponding sealing body or valve body, in the operating area (unrolling and rolling up modules) to be periodically ventilated. Consequently, the atmospheric pressure will press the valve or sealing body correspondingly firmer upon the sealing surface.

Other details and advantages of the object of the invention result from the drawing of an exemplary embodiment and the subsequent detailed description.

BRIEF DESCRIPTION OF THE DRAWING

The figures show in a simplified form, schematically and not according to scale.

DETAILED DESCRIPTION OF THE PREFERRED EMBODIMENT

Figure 1:
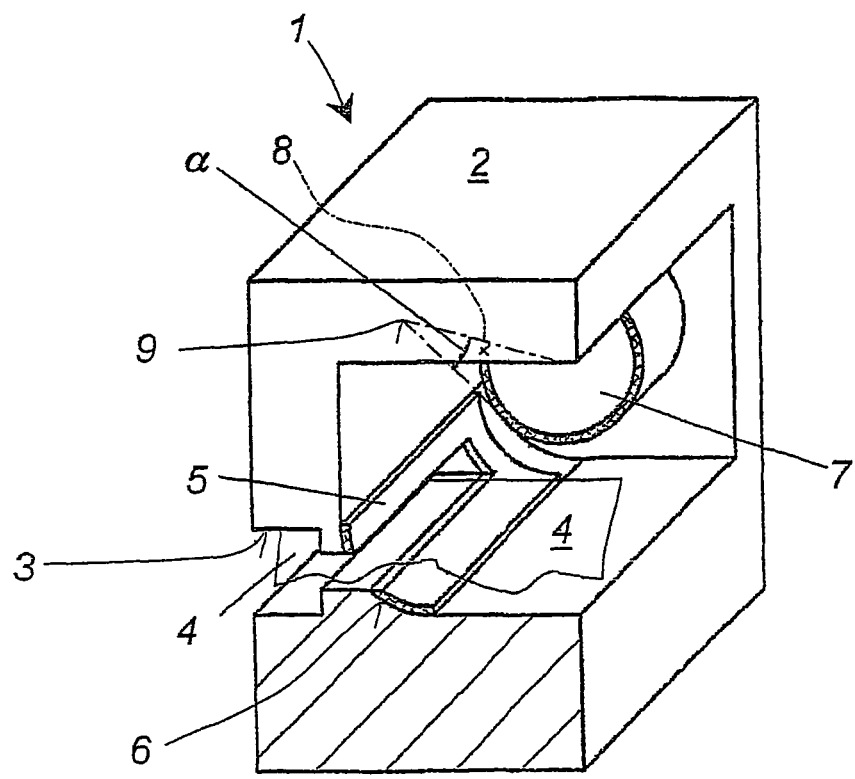
FIG. 1—partial cut through an embodiment of the air-lock valve according to the invention.

According to FIG. 1, an air-lock valve, generally designated as 1, comprises a housing 2, in which at least one opening 3 is provided for passage of a band substrate 4. In the preferred mounting position, at the left side of said housing 2 and opening 3, a vacuum coating chamber (not shown) is provided (for example, a sputtering chamber or similar unit), whilst at the right side of said housing 2, a chamber is sequentially provided, which can be alternately evacuated and ventilated (also not shown).

For the special use now described, the latter chamber will be an alternating chamber, containing a shaft to receive a bale or a spool of a band substrate. The latter is shown here in the form of a small partial section, designated number 4. This partial section of said band substrate 4 extends freely, i.e. without contact, through opening 3. Especially, it must also be insured that both lateral edges of said band substrate 4 do not establish contact with both lateral edges of the opening during operation. Contacts in an upward or downward direction (perpendicular to the surface plane of substrate) cannot always be avoided, when the band substrate oscillates.

One may recognize a sealing surface 5 surrounding said opening 3 in a frame-like fashion at the alternately evacuated and ventilated (right) side. The corresponding internal surface 6 of housing 2, into which opening 3 discharges, is cylindrically curved at least in the discharge section of opening 3.

The sealing seat in said housing preferably consists of metal, whilst the effective sealing surface 5 consists of a relatively thin, eventually also band-like material, or, for example, of a rubber coating, for example firmly fixed, for example glued, around opening 3 on said arcuate internal surface of housing 2. It has to be insured that the gap between the sealing surface 5 material and internal surface 6 of housing 2 are absolutely vacuum tight.

Additionally, by means of a swivel arm 8, a cylinder-shaped valve or sealing body 7 is rotably mounted around an axis 9 inside housing 2. The angle of traverse designated α, may be recognized between the inactive position (drawn section) and a closed position of said sealing body 7 at both phantom (dash-dotted line) representations of swivel arm 8. The cylindrical format of the sealing body offers the advantage that not always the same surface section of its cylindrical surface establishes contact with the sealing surface. Basically, the cylindrical sealing body may be rotably mounted on said swivel arm 8, similar to a roll cylinder. Also the roll consists of metal and its surface features a rubber coating.

Basically, also plastics may be used for the sealing seat and roll, as long as they are suitable for vacuum and especially do not have excessive outgasing features.

Sealing body 7 is longer than the width of opening 3, so that it also overlaps the short edges of said opening, being able to provide a direct sealing capacity.

Figure 2:
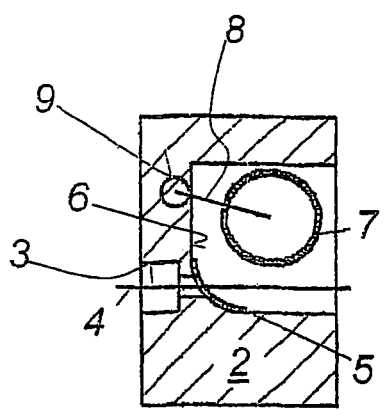
FIG. 2—opened position of said air-lock valve according to the invention.
Figure 3:
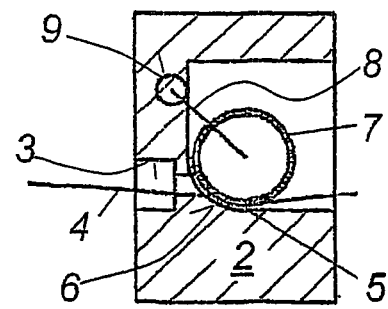
FIG. 3—closed position of said air-lock valve according to the invention.

FIG. 2 is a sectional view corresponding to FIG. 1, which enables a comparison with the closed position of the air-lock valve, as shown in FIG. 3. Similar components feature the same reference numbers in all figures.

While in FIG. 2, the band substrate 4 evidently may pass freely through opening 3, with the sealing body 7 featuring a larger corresponding distance to it, in FIG. 3, after rotating the sealing body around axis 9, i.e. angle α (FIG. 1), the band substrate 4 is firmly mounted between sealing body 7 and the lower edge of sealing surface 5. It is understood that switching the air lock valve 1 to the closed position should only be possible with the band substrate in a paralyzed position; the plant will comprise correspondingly adapted control features. Evidently, the air lock valve will be switched into the closed position still before ventilating the spool change room, when vacuum inside the coating chamber is to be preserved.

In order to avoid damages at the break of band substrate 4 in the area of the edge of sealing surface 5, at least the latter edge should be evenly rounded, consisting especially of highly soft, but resistant material.

Additionally, the curvature of sealing surface 5 advantageously is disposed in such an order that the sealing surface is continued from the sealing edge, situated here below band substrate 4, with a tangential angle, inclined in an obtuse angle in a perpendicular direction towards the (freely traversing) band substrate. With this procedure, the object may be attained—as can be quite well seen in FIG. 3—that said band substrate, mounted between sealing body 7 and sealing surface 5, will be deformed only in an obtuse, eventually rounded break.

It should be recalled that on the right side of the sealing body 7, i.e. of housing 2, atmospheric pressure may prevail, while in normal operation of the plant, on the left side vacuum always will prevail. As can be seen by means of the pressure differential from right to left, the contact pressure of sealing body 7 upon sealing surface 5, i.e., band substrate 4, is still being increased, so that an overall quite intense and trustworthy sealing effect will be attained.

A separate power drive not shown here for swivel arm 8 and sealing body 7 may be provided inside or outside of housing 2. Said drive being internally mounted, then advantageously a passage of a moveable component (shaft on axis 9) with the corresponding sealing effort may be eliminated. Eventually, line passages for electrical cables—for electrical drive—or tubes—for hydraulic or pneumatic drive—may be sealed with a more reduced effort.

The invention claimed is:

1. An air-lock valve comprising:
a housing having an opening configured to be traversed by a flexible band substrate; and
at least one moveable sealing body cooperating with a sealing surface of the housing for closing the opening during a closing phase of the air-lock valve, with the band substrate being clamped between the at least one movable sealing body and the sealing surface;
wherein the sealing surface surrounds the opening, and the opening is closed by pressing the at least one movable sealing body upon the sealing surface and/or upon the band substrate traversing the opening such that the at least one movable sealing body closes the opening at least through indirect abutting at edges of the sealing surface; and
wherein the at least one movable sealing body and the sealing surface each have an arcuate contour and a radius of the sealing surface is larger or equal to the radius of the at least one movable sealing body.

2. The air-lock valve according to claim 1, wherein:
the band substrate may be forced through the at least one movable sealing body against a sealing edge of the opening at the sealing surface, such that, in the area of the sealing edge, a tangent of the at least one movable sealing body produces an obtuse angle towards the longitudinal or traversing direction of the band substrate.

3. The air-lock valve according to claim 2, wherein:
the at least one movable sealing body and the sealing surface each have an arcuate contour and a radius of the sealing surface is larger or equal to the radius of the at least one movable sealing body.

4. The air-lock valve according to claim 3, wherein:
the sealing surface and/or the at least one movable sealing body are provided with an elastically flexible surface material.

5. The air-lock valve according to claim 3, wherein: the at least one movable sealing body comprises a cylindrical roll.

6. The air-lock valve according to claim 2, wherein:
the at least one movable sealing body comprises a cylindrical roll.

7. The air-lock valve according to claim 2, wherein:
the sealing surface and/or the at least one movable sealing body are provided with an elastically flexible surface material.

8. The air-lock valve according to claim 1, wherein:
the at least one movable sealing body comprises a cylindrical roll.

9. The air-lock valve according to claim 8, wherein:
the sealing surface and/or the at least one movable sealing body are provided with an elastically flexible surface material.

10. The air-lock valve according to claim 1, wherein:
the sealing surface and/or the at least one movable sealing body are provided with an elastically flexible surface material.

11. The air-lock valve according to claim 1, wherein:
the sealing surface comprises a planar, flexible material, being tightly connected, with a wall section in frame-like fashion in an area of a circumferential border of the opening.

12. The air-lock valve according to claim 1, wherein:
the at least one movable sealing body is a single cylindrical roll configured to close the opening.

13. The air-lock valve according to claim 1, wherein:
the at least one movable sealing body is rotably mounted.

14. The air-lock valve according to claim 1, wherein:
the at least one movable sealing body is moved between an inactive and a closed position by a separate power drive.

15. The air-lock valve according to claim 14, wherein:
the separate power drive is provided at or inside the housing.

16. The air-lock valve according to claim 1, wherein:
the at least one movable sealing body is firmly tightened against the sealing surface with a predetermined bearing load by an accumulator.

17. A processing plant for traversing band-like substrates comprising:
at least one evacuable processing chamber;
at least another chamber associated with the at least one evacuable processing chamber for unrolling or winding up the band substrate;
the chambers are interconnected through an opening through which the band substrate is guided; and
at least one air-lock valve provided at the opening;
the at least one air-lock valve comprising:
a housing having the opening; and
at least one moveable sealing body cooperating with a sealing surface of the housing for closing the opening during a closing phase of the air-lock valve, with the band substrate being clamped between the at least one movable sealing body and the sealing surface;
wherein the sealing surface surrounds the opening, and the opening is closed by pressing the at least one movable sealing body upon the sealing surface and/or upon the band substrate traversing the opening such that the at least one movable sealing body closes the opening at least through. indirect abutting at edges of the sealing surface; and
wherein the at least one movable sealing body and the sealing surface each have an arcuate contour and a radius of the sealing surface is larger or equal to the radius of the at least one movable sealing body.

18. The processing plant according to claim 17, wherein:
the at least one movable sealing body of at least one airlock valve and the sealing surface are turned towards the at least another chamber to be occasionally ventilated.

19. The processing plant according to claim 17, wherein:
the at least one movable sealing body comprises a cylindrical roll.

20. The air-lock valve according to claim 17, wherein:
the at least one movable sealing body is moved between an inactive and a closed position by a separate power drive.

21. The air-lock valve according to claim 17, wherein:
the at least one movable sealing body is firmly tightened against the sealing surface with a predetermined bearing load by an accumulator.

22. The air-lock valve according to claim 17, wherein:
the at least one movable sealing body is a single cylindrical roll configured to close the opening.

23. The air-lock valve according to claim 1, wherein:
the sealing surface surrounding the opening is arcuate and the body is a cylindrical roll configured to engage the arcuate sealing surface.

24. The processing plant according to claim 17, wherein:
the sealing surface surrounding the opening is arcuate and the body is a cylindrical roll configured to engage the arcuate sealing surface.

25. The air-lock valve according to claim 1, wherein:
the at least one movable sealing body closes the opening by abutting the sealing surface to wholly overlap the opening.

26. The processing plant according to claim 17, wherein:
the at least one movable sealing body closes the opening by abutting the sealing surface to wholly overlap the opening.

27. The air-lock valve according to claim 14, wherein:
the at least one movable sealing body is spaced from the sealing surface and configured to be spaced from the flexible substrate when in the inactive position.

28. The air-lock valve according to claim 20, wherein:
the at least one movable sealing body is spaced from the sealing surface and configured to be spaced from the flexible substrate when in the inactive position.

* * * * *